US009146581B2

(12) United States Patent
Li

(10) Patent No.: US 9,146,581 B2
(45) Date of Patent: Sep. 29, 2015

(54) HARD DISK DRIVE MOUNTING DEVICE AND ELECTRONIC DEVICE USING THE SAME

(71) Applicant: HON HAI PRECISION INDUSTRY CO., LTD., New Taipei (TW)

(72) Inventor: Jiunn-Her Li, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 39 days.

(21) Appl. No.: 14/098,457

(22) Filed: Dec. 5, 2013

(65) Prior Publication Data
US 2015/0109726 A1    Apr. 23, 2015

(30) Foreign Application Priority Data

Oct. 21, 2013   (TW) .............................. 102137882 A

(51) Int. Cl.
G06F 1/16       (2006.01)
G11B 33/02      (2006.01)
F16B 21/08      (2006.01)

(52) U.S. Cl.
CPC . G06F 1/16 (2013.01); F16B 21/08 (2013.01); G11B 33/02 (2013.01)

(58) Field of Classification Search
USPC .............. 345/1.3, 173, 905, 620, 8, 633, 169, 345/184, 156, 1.1, 168, 204, 161; 360/97.13, 75, 97.19, 66, 245.1, 97.16, 360/274, 98.08, 98.01, 246.1, 97.14, 245.4; 361/679.33, 679.37, 679.39, 679.58, 361/679.31, 679.47, 679.53, 679.08, 361/679.02, 679.34, 679.55; 248/298.1, 248/615, 638, 636, 224.8, 222.14, 213.2, 248/316.1, 562, 309.1; 312/223.2, 223.1, 312/223.3, 333, 294, 332.1
See application file for complete search history.

(56) References Cited

U.S. PATENT DOCUMENTS 7,701,706 B2 *    4/2010  Peng et al. ............... 361/679.37
2014/0160666 A1 *  6/2014  Peng et al. ............... 361/679.39
2015/0003005 A1 *  1/2015  Chen et al. ............... 361/679.33

* cited by examiner

Primary Examiner — Hung Duong
(74) Attorney, Agent, or Firm — Novak Druce Connolly Bove + Quigg LLP

(57) ABSTRACT

A hard disk drive mounting device for supporting hard disk drive includes a hard disk drive mounting device and two elastic arms located at lateral sides of the hard disk drive. A hard disk drive mounting device includes a bottom plate and two side plates extending upward from the bottom plate respectively. Each side plate has a plurality of positioning ribs and defines a positioning groove at a front end thereof. Each elastic arm defines a receiving space at an inner side thereof to receive the hard disk drive. An elastic clip is formed at outer side of the elastic arm and engaged with the positioning groove of the side plate. A plurality of receiving grooves is formed in the elastic arm. The positioning ribs on the side plate are engaged with the receiving grooves of the elastic arm.

20 Claims, 5 Drawing Sheets

HARD DISK DRIVE MOUNTING DEVICE AND ELECTRONIC DEVICE USING THE SAME

BACKGROUND

1. Technical Field

The disclosure generally relates to a hard disk drive mounting device, and an electronic device using the hard disk drive mounting device.

2. Description of Related Art

In a computer, one or more hard disk drives are often used for storing information. The hard disk drives are mounted in the electronic device by hard disk drive mounting device. However, the hard disk drives are typically secured to the hard disk drive mounting device by screws. It is inconvenience to assemble or disassemble the hard disk drive from the hard disk drive mounting device.

What is needed, therefore, is a hard disk drive mounting device to overcome the above described disadvantages.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, like reference numerals designate corresponding parts throughout the several views.

DETAILED DESCRIPTION

An embodiment of the electronic device and the hard disk drive mounting device will now be described in detail below with reference to the drawings.

Figure 1:
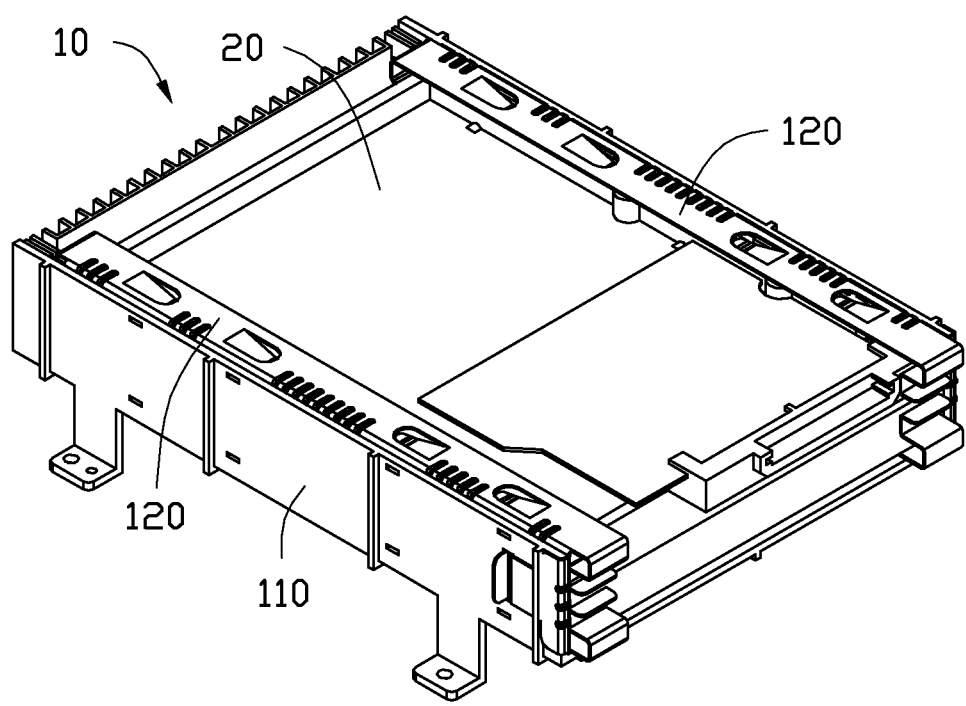
FIG. 1 is an isometric, assembled view of an electronic device in accordance with an embodiment of the present disclosure.
Figure 2:
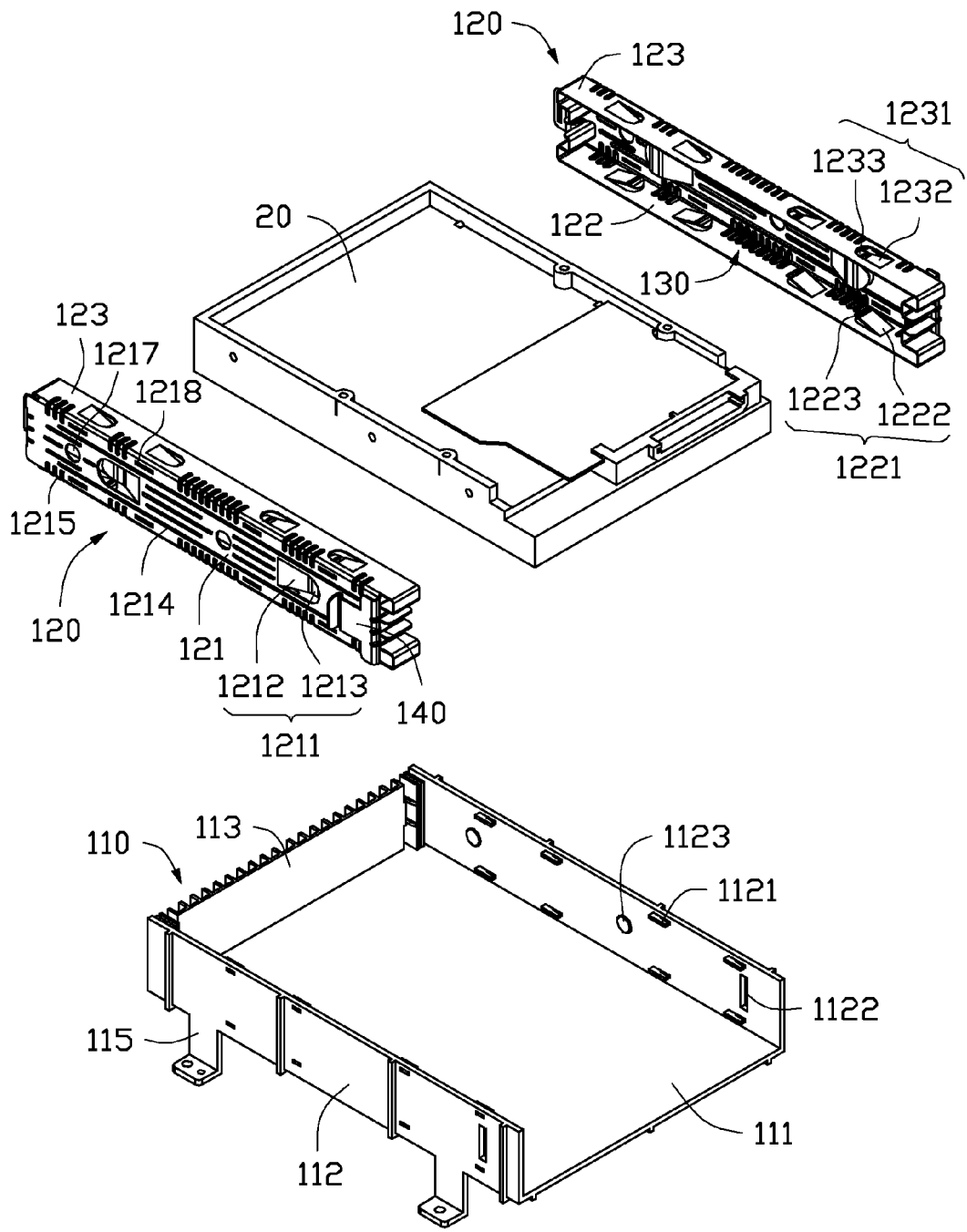
FIG. 2 is an isometric, exploded view of the electronic device of FIG. 1.

Referring to FIGS. 1-2, an electronic device in accordance with an embodiment of the present disclosure is provided. The electronic device includes a hard disk drive mounting device 10 and a hard disk drive 20 mounted on the hard disk drive mounting device 10. The hard disk drive mounting device 10 includes a mounting frame 110 and two elastic arms 120.

Figure 3:
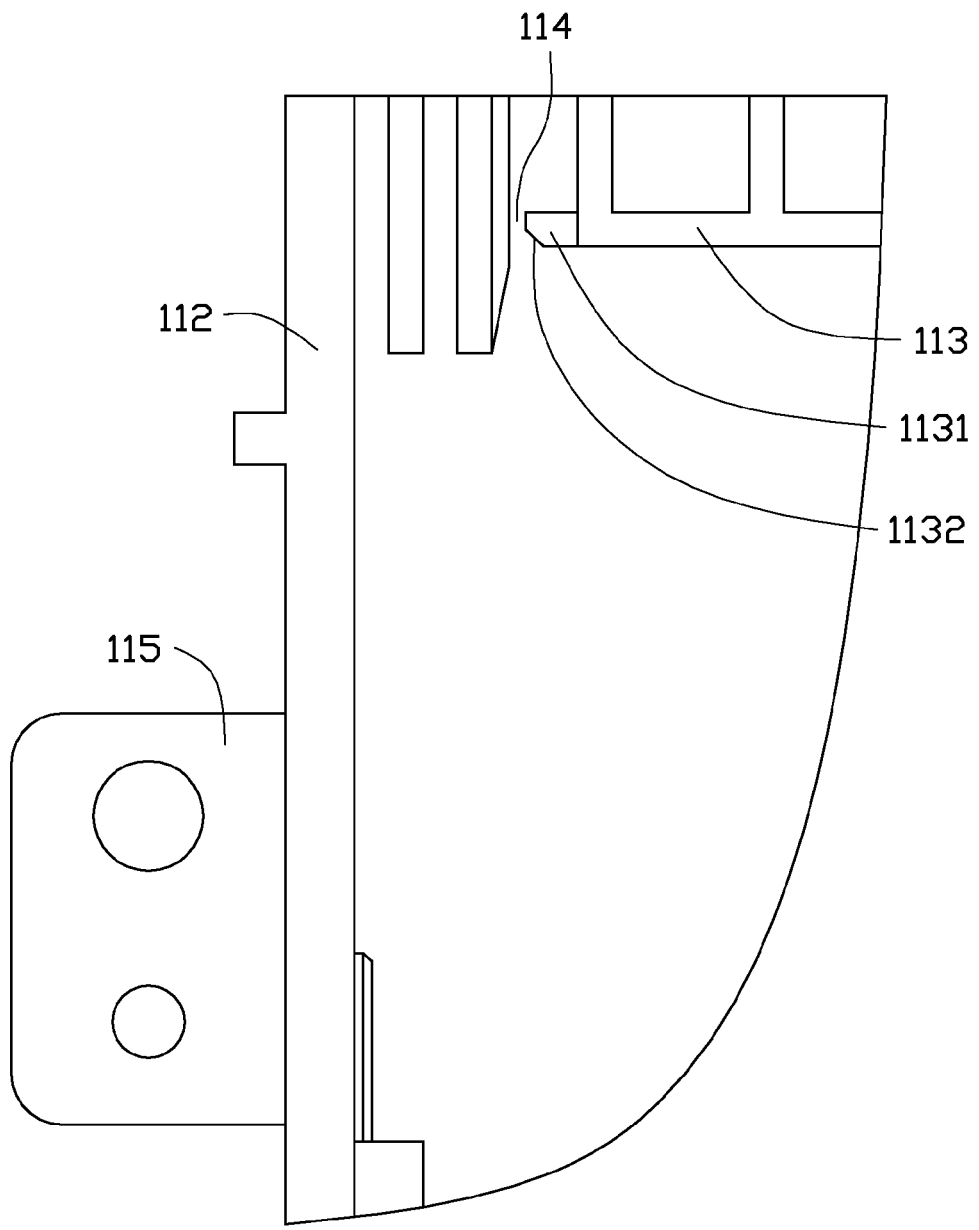
FIG. 3 is an enlarged view of a rear end of a hard disk drive mounting device in FIG. 2.

The mounting frame 110 includes a bottom plate 111, two side plates 112 extending upwardly from two lateral sides of the bottom plate 111, and an end plate 113 extending upwardly from a rear end of the bottom plate 111. The end plate 113 is located between the two side plates 112. The mounting frame 110 defines an opening at a front end for the hard disk drive 20 to assemble. Each side plate 112 has a plurality of positioning ribs 1121. The positioning ribs 1121 extend inwardly and horizontally from an inner wall of the side plates 112. In this embodiment, the positioning ribs 1121 are arranged in two rows. Each row of the positioning ribs 1121 are arranged along a elongate direction of the side plate 112. One row of the positioning ribs 1121 are located at an upper end of the side plate 112, and the other row of the positioning ribs 1121 are located at a bottom end of the side plate 112. The side plate 112 further defines a positioning groove 1122 at a front end of the thereof. The positioning groove 1122 extends in a direction perpendicular to the elongate direction of the side plate 112. Preferably, a plurality of positioning poles 1123 are formed on the inner wall of the side plates 112. The positioning poles 1123 extends inwardly and horizontally from the inner wall of each side plate 112. In this embodiment, the positioning poles 1123 are column-shaped and located between the two rows of the positioning ribs 1121. Referring also to FIG. 3, a gap 114 is formed between the side plate 112 and the end plate 113. The end plate 113 has a protrusion 1131 extending into the gap 114. The protrusion 1131 has a rectangular shaped, one angle of the protrusion 1131 is cut off to form an inclined surface 1132. In this embodiment, the mounting frame 110 further includes a plurality of supporting feets. The supporting feets 110 extend downwardly from the bottom plate 111 to secure the mounting frame 110 to a printed circuit board in outer environment.

Figure 4:
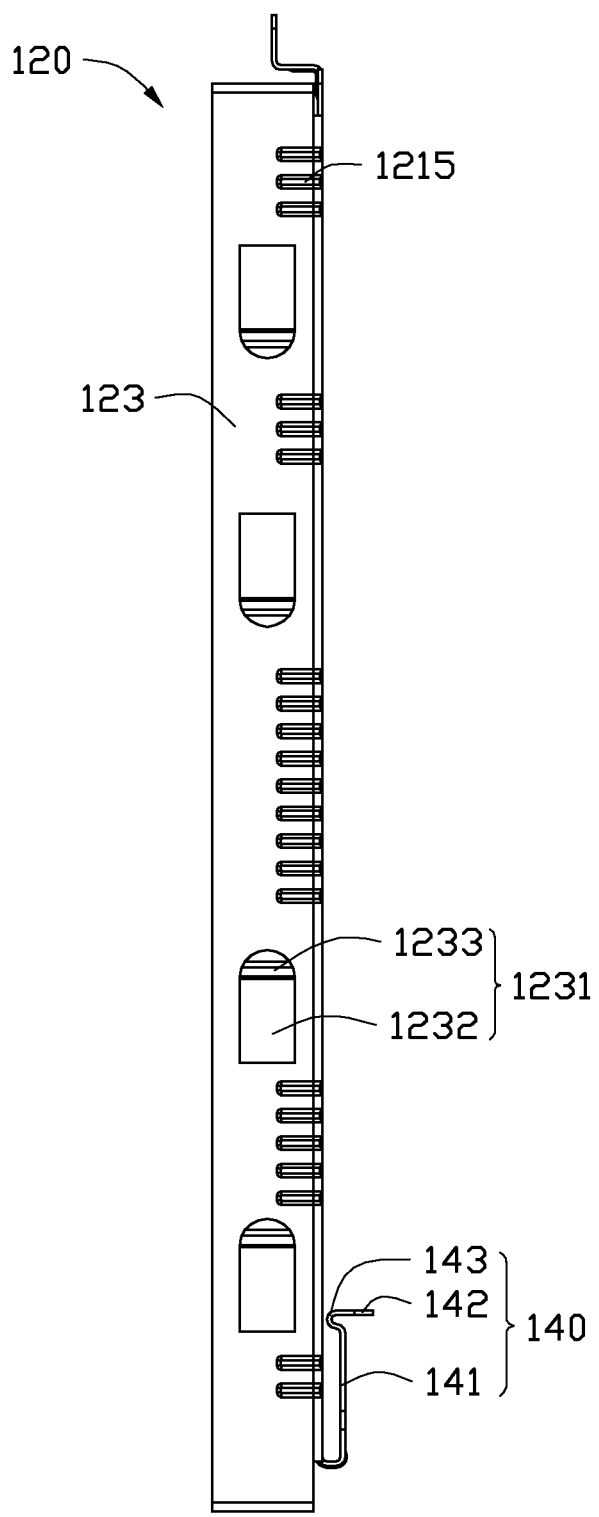
FIG. 4 is a top plan view showing an elastic arm in FIG. 2.
Figure 5:
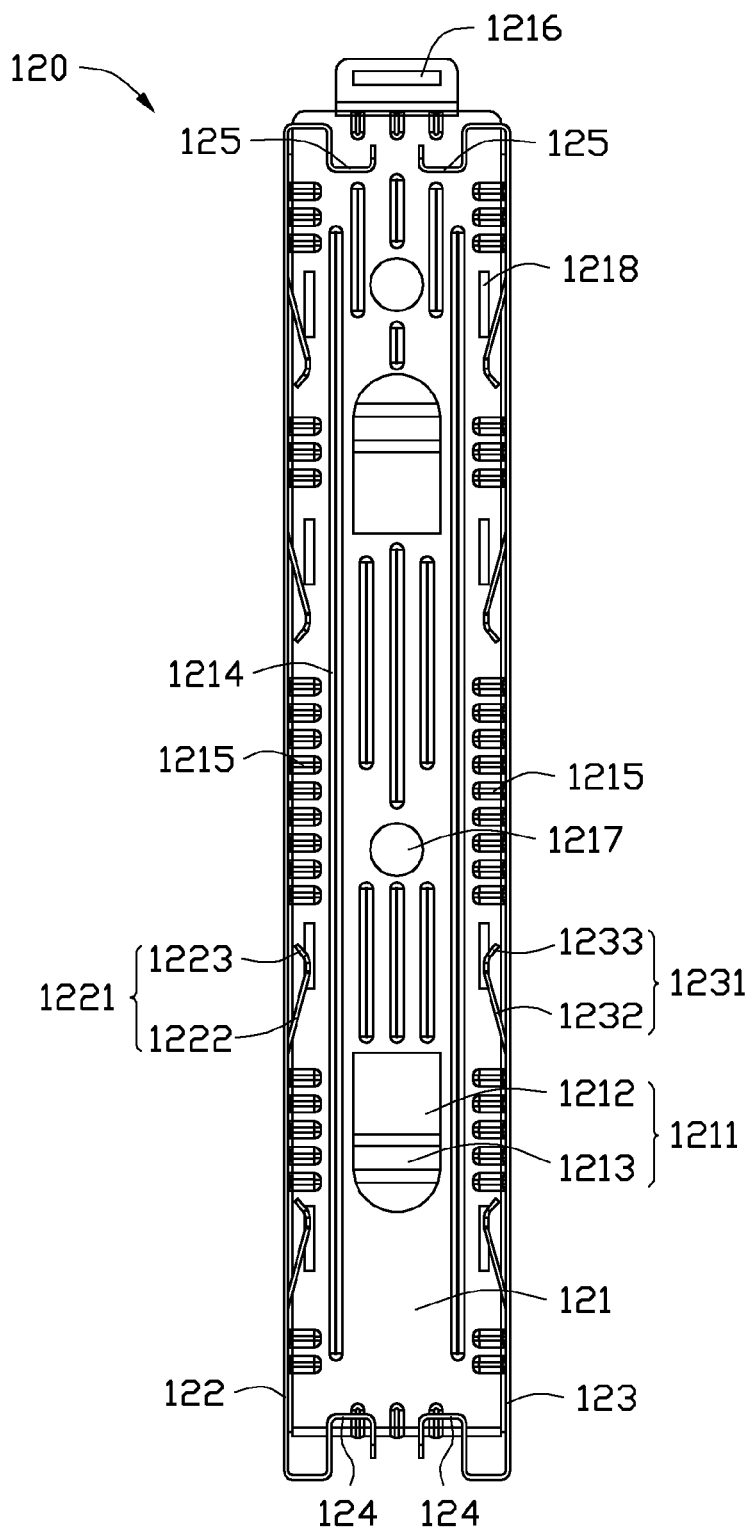
FIG. 5 is an inner side view showing the elastic arm in FIG. 2.

Referring also to FIGS. 4-5, the two elastic arms 120 are located at two lateral sides of the hard disk drive 20. The elastic arms 120 are made of metallic materials to effectively transmit heat generated by the hard disk drive 20 to outer environment. Each of the elastic arms 120 defines a receiving space 130 to receive the lateral side of the hard disk drive 20. An elastic clip 140 is formed at a lateral side of the elastic arms 120 to engage with the positioning groove 1122 at the front end of the side plate 112. Each elastic arm 120 includes a main body 121, a first clamping plate 122 and a second clamping plate 123 extending from an upper end and a bottom end of the main body 121 respectively. The front ends of the first clamping plate 122 and the second clamping plate 123 are bended inwardly to form a first blocking portion 124. The rear ends of the first clamping plate 122 and the second clamping plate are bended inwardly to form a second blocking portion 125. The main body 121, the first clamping plate 122, the second clamping plate 123, the first blocking portion 124 and the second blocking portion 125 together form a receiving space to receive the lateral side of the hard disk drive 20.

The main body 121 has a first elastic plate 1211 to support the hard disk drive 20. When the hard disk drive 20 is assembled to the receiving space 130 of the elastic arm 120, the first elastic plate 1211 is abutting to a side surface of the hard disk drive 20. The first elastic plate 1211 is formed by cutting off a part of the main body 121 and includes a first connecting portion 1212 and a first abutting portion 1213. The first connecting portion 1212 extends obliquely and inwardly from the main body 121. The first abutting portion 1213 is formed at one end of the first connecting portion 1212 opposite to the main body 121 to abut the hard disk drive 20. The main body 121 further includes a plurality of first impressions 1214 and a plurality of second impressions 1215. The first impressions 1214 are formed in a middle portion of the main body 121 and extend along an elongate direction of the main body 121. The second impressions 1215 are formed at upper end and bottom end of the main body 121 respectively and extend along a direction perpendicular to the elongate direction of the main body 121. In this embodiment, the second impressions 1214 at the bottom end of the main body 121 further extend to the first clamping plate 122. The second impressions 1214 at the upper end of the main body 121 further extend to the second clamping plate 123. The first impressions 1213 and the second impressions 1214 are configured to improve the mechanical strength of the main body 121, the first clamping plate 122 and the second clamp plate 123, and avoid deformation of the elastic arm 120. In this embodiment, the elastic clip 140 is formed at the main body 11 of the elastic arm 120. The elastic clip 140 includes a connecting section 141 and a clipping section 142 extending vertically from one end of the connection section 141. The connecting section 141 is parallel to the main body 121 of the elastic arm 120 and bended outwardly from a front end of the main body 121. The connecting part between the connecting section 141 and the clipping section 142 are curved inwardly to the main body 121 to form a flange 143. The rear end of the main body 121 is bended inwardly and defining a securing groove 1216. When the elastic arms 120 located at two lateral sides of the hard disk drive 20 are assembled to the mounting frame 110, the protrusion 1121 of the end plate 113 is engaged with the securing groove 1216 of the main body 121 to secure the elastic arm 120 to the mounting frame 110. The main body 121 further defines a plurality of positioning holes 1217. The positioning holes 1217 are corresponding to the positioning poles 1123 on the side plate 112. When the elastic arms 120 having the hard disk drive 20 are assembled to the mounting frame 110, the positioning poles 1123 are inserted into the positioning poles 1217. Preferably, the main body 121 further defines a plurality of receiving grooves 1218. When the elastic clip 140 is engaged with the positioning groove 1122 at the front end of the side plate 112, the positioning ribs 1121 will be engaged with the receiving grooves 1218 of the elastic arm 120.

The first clamping plate 122 has a second elastic plate 1221. When the hard disk drive 20 is assembled to the receiving space 130 of the elastic arm 120, the second elastic plate 1221 is abutting to a bottom surface of the hard disk drive 20. The second elastic plate 1221 is formed by cutting off a part of the first clamping plate 122 and includes a second connecting portion 1222 and a second abutting portion 1223. The second connecting portion 1222 extends obliquely and upwardly from the first clamping plate 122. The second abutting portion 1223 is formed at one end of the second connecting portion 1222 opposite to the first clamping plate 122 to abut the hard disk drive 20.

The second clamping plate 123 has a third elastic plate 1231. When the hard disk drive 20 is assembled to the receiving space 130 of the elastic arm 120, the third elastic plate 1231 is abutting to an upper surface of the hard disk drive 20. The third elastic plate 1231 is formed by cutting off a part of the second clamping plate 123 and includes a third connecting portion 1232 and a third abutting portion 1233. The third connecting portion 1232 extends obliquely and inwardly from the second clamping plate 123. The third abutting portion 1233 is formed at one end of the third connecting portion 1232 opposite to the second clamping plate 123 to abut the hard disk drive 20.

In assembling, the two elastic arms 120 are located at two lateral sides of the hard disk drive 20. The lateral side of the hard disk drive 20 is received in the receiving space 130 of the elastic arm 120. At that time, the first elastic plate 1211 of the main body 121 is abutting to the side surface of the hard disk drive 20, the second elastic plate 1221 of the first clamping plate 122 is abutting to the bottom surface of the hard disk drive 20, and the third elastic plate 1231 of the second clamping plate 123 is abutting to the upper surface of the hard disk drive 20. Then, the two elastic arms 120 are pressed inwardly to assemble the two elastic arms 120 to the mounting frame 110 from the opening of the mounting frame 110. When the clipping section 142 of the elastic clip 140 contacts the side plate 112, an inwardly force is applied to the connecting section 141 of the elastic clip 140. Therefore, the connecting section 141 the elastic clip 140 are deformed to make the elastic clip 140 being received in the mounting frame 110 and continue to move into the mounting frame 110. At that time, since the connecting part between the connecting section 141 and the clipping section 142 has the flange 143 curved inwardly to the main body 121, the flange 143 can prevent the connecting section 141 from overbending, thereby making the clipping section 142 can not be effective engaged with the positioning groove 1122 of the side plate 112. The elastic arms 120 are continued to move inside the mounting frame 110 until the elastic clip 140 is engaged with the positioning groove 1122 of the side plate 112. At that time, the positioning ribs 1121 of the side plate 112 will be engaged with the receiving grooves 1218 of the elastic arm 120, and the positioning poles 1123 of the side plate 112 will be inserted into the positioning holes 1217 of the main body 121. Therefore, the mounting frame 110, the elastic arms 120 and the hard disk drive 20 will be assembled together. In addition, since one angle of the protrusion 1131 is cut off and forms the inclined surface 1132. When the rear end of the main body 121 passes through the gap 114 between the side plate 112 and the end plate 113, the inclined surface 1132 can make the rear end of the main body 121 bend slightly until the protrusion 1131 is engaged with the securing groove 1216. That is, the inclined surface 1132 can strength the engagement of the protrusion 1131 and the securing groove 1216. In the process described above, the hard disk drive 20 is assembled to the hard disk drive mounting device 10 without screws and the process become more convenience.

In disassembling, the elastic arms 120 are pressed inwardly to depart positioning ribs 1121 from the receiving grooves 1218, an inwardly force is applied to the connecting section 141 of the elastic clip 140 to depart the clipping section 142 from the positioning groove 1122, and an outwardly force is applied to the rear end of the main body 121 to depart the protrusion 1131 from the securing groove 1216. Then, the elastic arms 120 having the hard disk drive 20 can be pulled out of the mounting frame 110. When the elastic arms 120 is totally pulled out of the mounting frame 110, the elastic arms 120 can be departed from the hard disk drive 20.

It is to be further understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A hard disk drive mounting device for supporting hard disk drive, comprising:
   a hard disk drive mounting device, comprising a bottom plate and two side plates extending upward from the bottom plate respectively, each side plate having a plurality of positioning ribs and defining a positioning groove at a front end thereof; and
   two elastic arms, located at lateral sides of the hard disk drive, each elastic arm defining a receiving space at an inner side thereof to receive the hard disk drive, an elastic clip being formed at outer side of the elastic arm and engaged with the positioning groove of the side plate, a plurality of receiving grooves being formed in the elastic arm, the positioning ribs on the side plate being engaged with the receiving grooves of the elastic arm.

2. The hard disk drive mounting device of claim 1, wherein each elastic arm comprise a main body, a first clamping plate extending from a bottom end of the main body and a second clamping plate extending from an upper end of the main body, front ends of the first clamping plate and the second clamping plate are bended inwardly to form a first blocking portion, rear ends of the first clamping plate and the second clamping plate are bended inwardly to form a second blocking portion, the main body, the first clamping plate, the second clamping plate, the first blocking portion and the second blocking portion together forms the receiving space to receive the hard disk drive.

3. The hard disk drive mounting device of claim 2, wherein the main body having a first elastic plate, the first clamping plate having a second elastic plate, the second clamping plate having a third elastic plate, when the hard disk drive is assembled to the receiving space of the elastic arm, the first elastic plate is abutting to a side surface of the hard disk drive, the second elastic plate is abutting to a bottom surface of the hard disk drive and the third elastic plate is abutting to an upper surface of the hard disk drive.

4. The hard disk drive mounting device of claim 3, wherein the first elastic plate comprises a first connecting portion and a first abutting portion, the first connecting portion extending obliquely and inwardly from the main body, the first abutting portion formed at one end of the first connecting portion opposite to the main body to abut the hard disk drive, the second elastic plate comprises a second connecting portion and a second abutting portion, the second connecting portion extending obliquely and upwardly from the first clamping plate, the second abutting portion is formed at one end of the second connecting portion opposite to the first clamping plate to abut the hard disk drive, the third elastic plate comprises a third connecting portion and a third abutting portion, the third connecting portion extending obliquely and downwardly from the second clamping plate, the third abutting plate is formed at one end of the third connecting portion opposite to the second clamping plate to abut the hard disk drive.

5. The hard disk drive mounting device of claim 2, wherein the elastic clip is formed at the main body of the elastic arm and bended outwardly from the main body, the elastic clip comprises a connecting section and a clipping section, the connecting section is parallel to the main body, the clipping section extending vertically from one end of the connecting section opposite to the main body, a connecting portion between the clipping section and the clipping section curves towards the main body to form a flange.

6. The hard disk drive mounting device of claim 2, wherein the main body of the elastic arm further comprises a plurality of first impressions and a plurality of second impressions, the first impressions are formed in a middle portion of the main body and extends along an elongate direction of the main body, the second impressions are formed at a bottom end and an upper end of the main body respectively, the second impressions are perpendicular to the first impressions and further extending to the first clamping plate and the second clamping plate respectively.

7. The hard disk drive mounting device of claim 2, wherein the mounting frame further comprises an end plate extending upwardly from a rear end of the bottom plate, the end plate is located between the two side plates, a gap is formed between the side plate and the end plate, the end plate has a protrusion extending into the gap, the rear end of the main body of the elastic arm further defines a securing groove, when the elastic arms located at two lateral sides of the hard disk drive are assembled to the mounting frame, the protrusion of the end plate is engaged with the securing groove of the main body to secure the elastic arm to the mounting frame.

8. The hard disk drive mounting device of claim 2, wherein the main body of the elastic arm further defines a plurality of positioning holes, a plurality of positioning poles are formed at the side plate, the positioning poles extends inwardly and horizontally from an inner wall of the side plate, when the elastic arms located at two lateral sides of the hard disk drive are assembled to the mounting frame, the positioning poles are inserted into the positioning holes of the elastic arm.

9. The hard disk drive mounting device of claim 2, wherein the mounting frame further comprises a plurality of mounting feets, the mounting feets extends downwardly from the bottom plate of the mounting frame to secure the mounting frame to outer environment.

10. The hard disk drive mounting device of claim 2, wherein the elastic arms are made of metallic materials.

11. An electronic device, comprising:
a hard disk drive; and
a hard disk drive mounting device for supporting hard disk drive, comprising:
a hard disk drive mounting device, comprising a bottom plate and two side plates extending upward from the bottom plate respectively, each side plate having a plurality of positioning ribs and defining a positioning groove at a front end thereof; and
two elastic arms, located at lateral sides of the hard disk drive, each elastic arm defining a receiving space at an inner side thereof to receive the hard disk drive, an elastic clip being formed at outer side of the elastic arm and engaged with the positioning groove of the side plate, a plurality of receiving grooves being formed in the elastic arm, the positioning ribs on the side plate being engaged with the receiving grooves of the elastic arm.

12. The hard disk drive mounting device of claim 11, wherein each elastic arm comprise a main body, a first clamping plate extending from a bottom end of the main body and a second clamping plate extending from an upper end of the main body, front ends of the first clamping plate and the second clamping plate are bended inwardly to form a first blocking portion, rear ends of the first clamping plate and the second clamping plate are bended inwardly to form a second blocking portion, the main body, the first clamping plate, the second clamping plate, the first blocking portion and the second blocking portion together forms the receiving space to receive the hard disk drive.

13. The hard disk drive mounting device of claim 12, wherein the main body having a first elastic plate, the first clamping plate having a second elastic plate, the second clamping plate having a third elastic plate, when the hard disk drive is assembled to the receiving space of the elastic arm, the first elastic plate is abutting to a side surface of the hard disk drive, the second elastic plate is abutting to a bottom surface of the hard disk drive and the third elastic plate is abutting to an upper surface of the hard disk drive.

14. The hard disk drive mounting device of claim 13, wherein the first elastic plate comprises a first connecting portion and a first abutting portion, the first connecting portion extending obliquely and inwardly from the main body, the first abutting portion formed at one end of the first connecting portion opposite to the main body to abut the hard disk drive, the second elastic plate comprises a second connecting portion and a second abutting portion, the second connecting portion extending obliquely and upwardly from the first clamping plate, the second abutting portion is formed at one end of the second connecting portion opposite to the first clamping plate to abut the hard disk drive, the third elastic plate comprises a third connecting portion and a third abutting portion, the third connecting portion extending obliquely and downwardly from the second clamping plate, the third abutting plate is formed at one end of the third connecting portion opposite to the second clamping plate to abut the hard disk drive.

15. The hard disk drive mounting device of claim 12, wherein the elastic clip is formed at the main body of the elastic arm and bended outwardly from the main body, the elastic clip comprises a connecting section and a clipping section, the connecting section is parallel to the main body, the clipping section extending vertically from one end of the connecting section opposite to the main body, a connecting portion between the clipping section and the clipping section curves towards the main body to form a flange.

16. The hard disk drive mounting device of claim 12, wherein the main body of the elastic arm further comprises a plurality of first impressions and a plurality of second impressions, the first impressions are formed in a middle portion of the main body and extends along an elongate direction of the main body, the second impressions are formed at a bottom end and an upper end of the main body respectively, the second impressions are perpendicular to the first impressions and further extending to the first clamping plate and the second clamping plate respectively.

17. The hard disk drive mounting device of claim 12, wherein the mounting frame further comprises an end plate extending upwardly from a rear end of the bottom plate, the end plate is located between the two side plates, a gap is formed between the side plate and the end plate, the end plate has a protrusion extending into the gap, the rear end of the main body of the elastic arm further defines a securing groove, when the elastic arms located at two lateral sides of the hard disk drive are assembled to the mounting frame, the protrusion of the end plate is engaged with the securing groove of the main body to secure the elastic arm to the mounting frame.

18. The hard disk drive mounting device of claim 12, wherein the main body of the elastic arm further defines a plurality of positioning holes, a plurality of positioning poles are formed at the side plate, the positioning poles extends inwardly and horizontally from an inner wall of the side plate, when the elastic arms located at two lateral sides of the hard disk drive are assembled to the mounting frame, the positioning poles are inserted into the positioning holes of the elastic arm.

19. The hard disk drive mounting device of claim 12, wherein the mounting frame further comprises a plurality of mounting feets, the mounting feets extends downwardly from the bottom plate of the mounting frame to secure the mounting frame to outer environment.

20. The hard disk drive mounting device of claim 12, wherein the elastic arms are made of metallic materials.

* * * * *